United States Patent
Zhao et al.

(10) Patent No.: US 9,619,884 B2
(45) Date of Patent: Apr. 11, 2017

(54) 2D TO 3D IMAGE CONVERSION DEVICE AND METHOD

(71) Applicant: Amlogic Co., Ltd., Santa Clara, CA (US)

(72) Inventors: Weihao Zhao, Shanghai (CN); Xuyun Chen, San Jose, CA (US); Dongjian Wang, San Jose, CA (US)

(73) Assignee: Amlogic Co., Limited, Santa Clara, CA (US)

( * ) Notice: Subject to any disclaimer, the term of this patent is extended or adjusted under 35 U.S.C. 154(b) by 348 days.

(21) Appl. No.: 14/270,172

(22) Filed: May 5, 2014

(65) Prior Publication Data

US 2015/0097927 A1    Apr. 9, 2015

Related U.S. Application Data

(60) Provisional application No. 61/886,602, filed on Oct. 3, 2013.

(51) Int. Cl.
*H04N 13/00* (2006.01)
*G06T 7/00* (2017.01)
*H04N 13/02* (2006.01)

(52) U.S. Cl.
CPC ......... *G06T 7/0051* (2013.01); *H04N 13/026* (2013.01); *H04N 13/0271* (2013.01); *G06T 2207/10021* (2013.01)

(58) Field of Classification Search
CPC ........ G06T 2207/10021; G06T 7/0051; H04N 13/026; H04N 13/0271
USPC ........................................................... 348/43
See application file for complete search history.

(56) References Cited

U.S. PATENT DOCUMENTS

| | | | | |
|---|---|---|---|---|
| 9,098,911 B2* | 8/2015 | Wu | ........................ | G06T 7/0065 |
| 2008/0247670 A1* | 10/2008 | Tam | ........................ | G06T 7/0051 382/298 |
| 2010/0141757 A1* | 6/2010 | Baik | ..................... | G06T 7/0077 348/135 |
| 2010/0165081 A1* | 7/2010 | Jung | ................... | H04N 13/0022 348/46 |
| 2011/0096832 A1* | 4/2011 | Zhang | ................... | G06T 7/0071 375/240.08 |
| 2013/0070050 A1* | 3/2013 | Ha | ......................... | H04N 5/144 348/43 |
| 2013/0202220 A1* | 8/2013 | Takeshita | ............. | H04N 13/026 382/264 |
| 2013/0314494 A1* | 11/2013 | Chen | ..................... | G06T 7/0071 348/43 |

* cited by examiner

*Primary Examiner* — Jessica M Prince
(74) *Attorney, Agent, or Firm* — Venture Pacific Law, PC

(57) ABSTRACT

A method to convert two-dimensional ("2D") image content into three-dimensional ("3D") image content for display on a display device, comprises the steps of: analyzing the 2D image content for predefined indicators and generating a depth map for each of the predefined indicators; determining a combined depth map as a function of the generated depth maps; and generating the 3D image content for display on the display device as a function of the combined depth map.

17 Claims, 7 Drawing Sheets

Depth-from-Details Depth Map

2D TO 3D IMAGE CONVERSION DEVICE AND METHOD

CROSS REFERENCE

This application claims priority from a provisional patent application entitled "2-D to 3-D Video Conversion" filed on Oct. 3, 2013 and having an Application No. 61/886,602. Said application is incorporated herein by reference.

FIELD OF INVENTION

The disclosure relates to image conversion, and, more particularly, to a method and a device for two-dimensional to three-dimensional image conversion.

BACKGROUND

As three-dimensional ("3D") display devices become more ubiquitous in consumer electronics (e.g., liquid crystal display screens, plasma screens, cellular phones, etc.), generating 3D content for display on the consumer electronics becomes a growing area of research and development. As such, various real-time two-dimensional ("2D") to 3D image conversion technologies have been developed to obtain 3D content from existing 2D video content sources, such as DVD, Blu-Ray, and over-the-air broadcasting. However, the current technologies are not acceptable for long term usage due to their high computational complexity and/or unsatisfactory image quality.

Current techniques for 2D to 3D video conversion use frame to frame movement obtained from video content analysis to reconstruct 3D objects. Furthermore, motion vectors can be further combined with other disclosed techniques such as linear perspective and color-based segmentation to obtain a qualitative depth map. However, calculating motion vectors and semantic video content analysis significantly increase computational complexity. For the foregoing reasons, there is a need for new methods and apparatuses for 2D to 3D image conversion having less computational complexity and implementations costs.

SUMMARY OF INVENTION

Briefly, the disclosure relates to a method to convert two-dimensional ("2D") image content into three-dimensional ("3D") image content for display on a display device, comprising the steps of: analyzing the 2D image content for predefined indicators and generating a depth map for each of the predefined indicators; determining a combined depth map as a function of the generated depth maps; and generating the 3D image content for display on the display device as a function of the combined depth map.

DESCRIPTION OF THE DRAWINGS

The foregoing and other aspects of the disclosure can be better understood from the following detailed description of the embodiments when taken in conjunction with the accompanying drawings.

DETAILED DESCRIPTION OF THE EMBODIMENTS

In the following detailed description of the embodiments, reference is made to the accompanying drawings, which form a part hereof, and in which is shown by way of illustration of specific embodiments in which the disclosure may be practiced.

Figure 1:
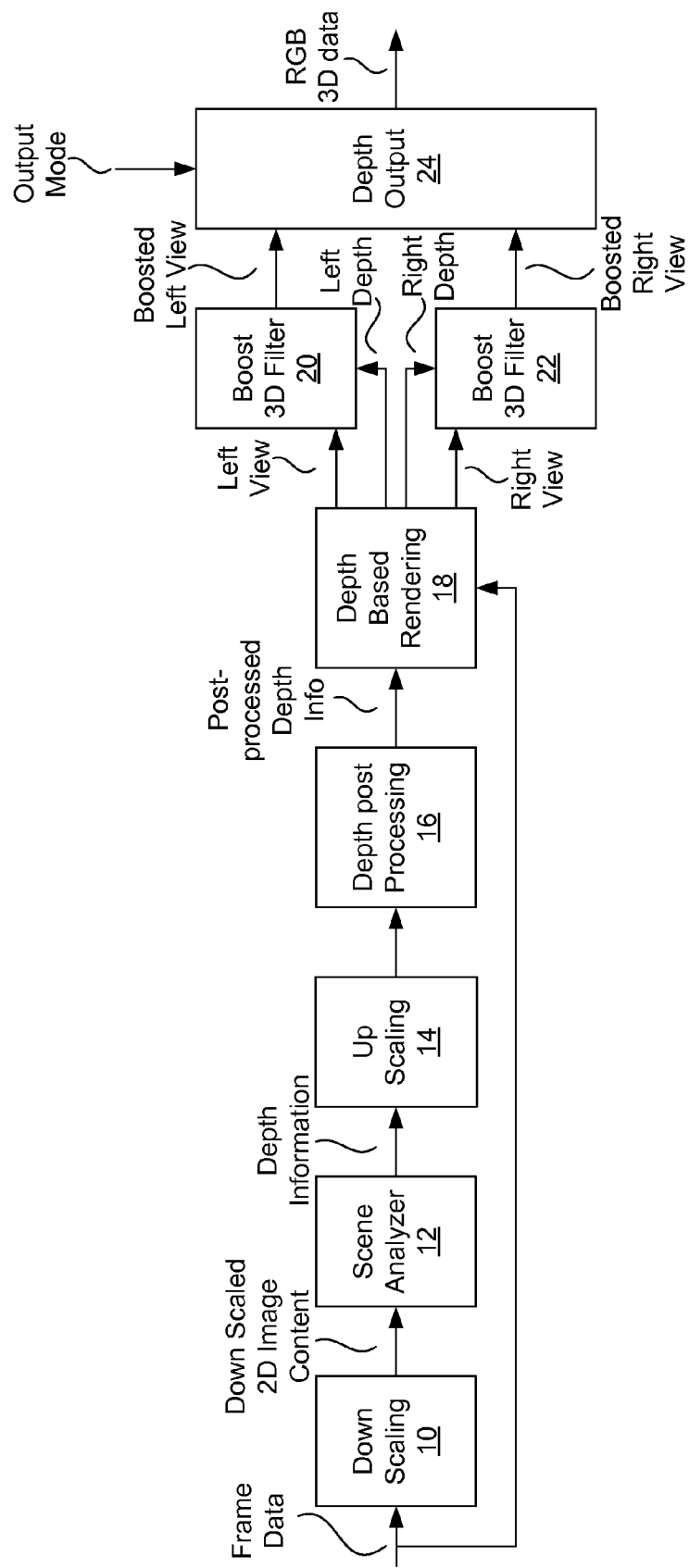
FIG. 1 illustrates a block diagram for a 2D to 3D image converter.

FIG. 1 illustrates a block diagram for a 2D to 3D image converter. A 2D to 3D image content converter can comprise a down scaling block 10, a scene analyzer 12, a up scaling block 14, a depth post processing block 16, a depth based rendering block 18, boost 3d filters 20 and 22, and a depth output block 24. 2D image content (e.g., frame data) can be inputted to the down scaling block 10 to down scale the 2D image content by a predefined factor (e.g., 2, 4, 8, or another predefined number). The 2D image content can be formatted in a YUV color space, an RGB color space, a PMS color space, an NCS color space, a TSL color space, or other image color space. For this example, the 2D image content is formatted in the YUV color space and can be processed one frame at a time. Thus, 2D to 3D conversion can be performed in frame. It is understood that other color spaces can also be used in the present disclosure.

The downscaled 2D image content is inputted to the scene analyzer 12 to identify predefined indicators (e.g., areas, objects, colors, models, luma values, etc.) in the down scaled 2D image content. For instance, a predefined area, a predefined object, predefined color, a predefined model, predefined luma values, and/or other predefined indicators can be identified. Once identified, depth information for the 2D image content is generated as a function of the identified predefined indicators.

The depth information is then inputted to the up scaling block 14 to up scale the depth information into an original format size of the 2D image content. The up scaled depth information is inputted to the depth post processing block 16. The depth post processing block 16 can apply an infinite impulse response ("IIR") to the downscaled 2D image content for sharpening the depth information. A finite impulse response (or other filter) can be applied as well to provide flexibility and to meet performance needs. Next, the depth post processing block 16 outputs a left view, a left view depth information, a right view, and a right view depth information.

The left view and the left view depth information are inputted to the boost 3D filter 20. The boost 3D filter 20 can boost (e.g., sharpen) the YUV left view, and output the boosted left view to the depth output block 24. Also, the right view and the right view depth information are inputted to the boost 3D filter 22. The boost 3D filter 22 can boost (e.g., sharpen) the YUV right view, and output the boosted right view to the depth output block 24. The depth output block 24 can receive the boosted left view and the boosted right view, and output the 3D image content according to the type of output mode selected to fit the format of the display device.

It is understood that down scaling and up scaling can be optional components in the embodiment. Down scaling and up scaling can aid in reducing the computational complexity. However, a non-down scaled 2D image content can also be used in conjunction with the embodiment. Furthermore, post processing block and filtering blocks can also be optional components in the embodiment. The description of the down scaling, up scaling, post processing, and filtering of the embodiment is not meant to limit the invention to such specific embodiment.

Figure 2:
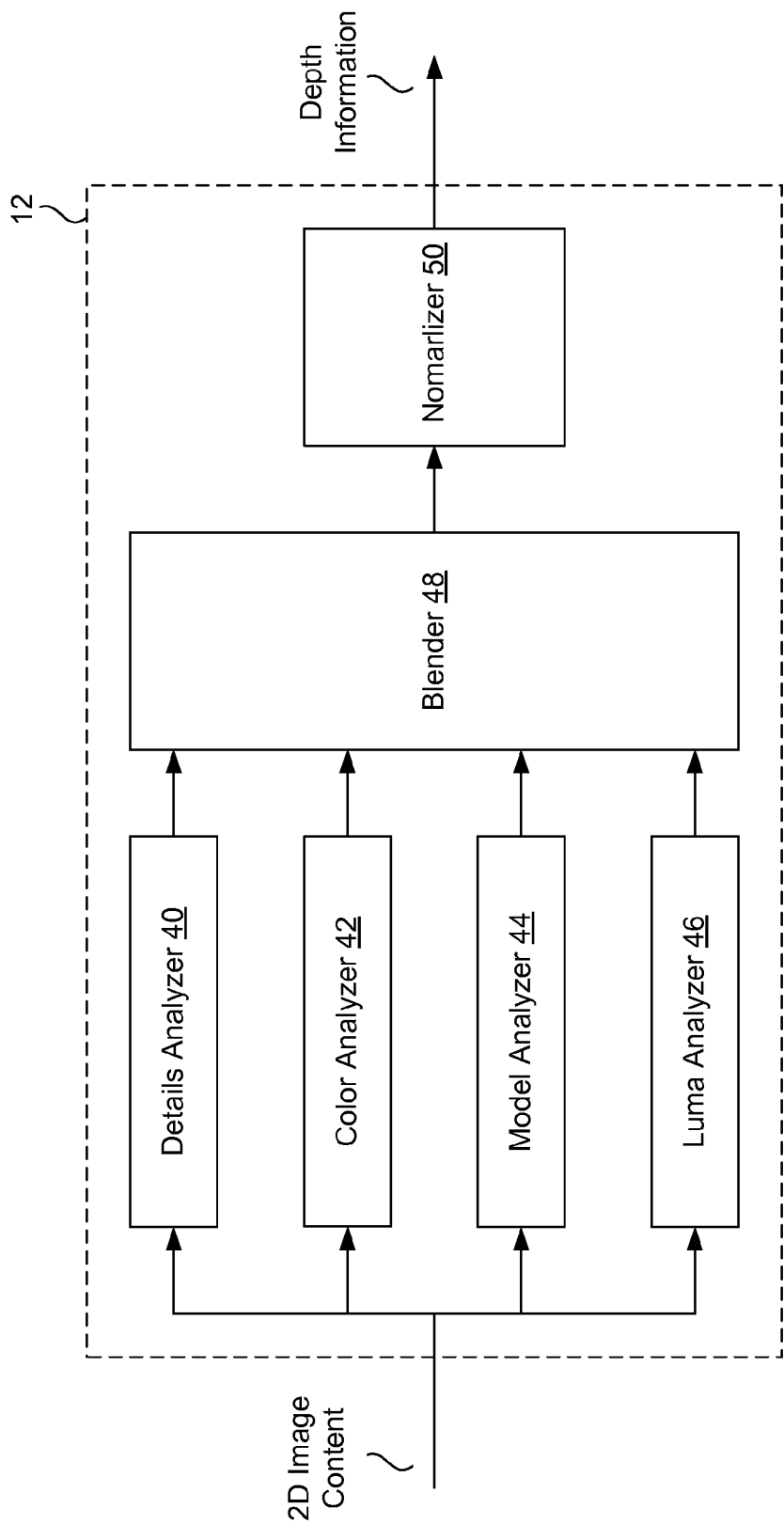
FIG. 2 illustrates a block diagram for a scene analyzer.

FIG. 2 illustrates a block diagram for a scene analyzer. The scene analyzer 12 comprises a details analyzer 40, a color analyzer 42, a model analyzer 44, a luma analyzer 46, a blender 48, and a normalizer 50. It is understood by a person having ordinary skill in the art that a scene analyzer can comprise one or more analyzers for a predefine number of scene indicators. The blender 48 and the normalizer 50 can also be substituted by other components or omitted altogether. Therefore, the illustration in FIG. 2 is in no way meant to limit the disclosure.

Referring to FIG. 2, the 2D image content can be inputted to each of the analyzers 40-46. The details analyzer 40 detects any areas in the 2D image content that has image details, and then generates a depth-from-details depth map accordingly. The color analyzer 42 detects any areas in the 2D image content that has a predefined color, and then generates a depth-from-color depth map accordingly. The model analyzer 44 selects a scene model for the 2D image content, and then generates a depth-from-model depth map accordingly. The luma values analyzer 46 detects any areas in the 2D image that are above one or more predefined luma values, and then generates a depth-from-luma depth map accordingly.

The depth-from-details depth map, depth-from-color depth map, depth-from-model depth map, and depth-from-luma depth map are inputted to the blender 48. The blender 48 can apply a weighting algorithm to the various maps to generate a blended depth map. The blended depth map is outputted to the normalizer 50, which normalizes the blended depth map and outputs the normalized depth map as depth information.

Figure 3:
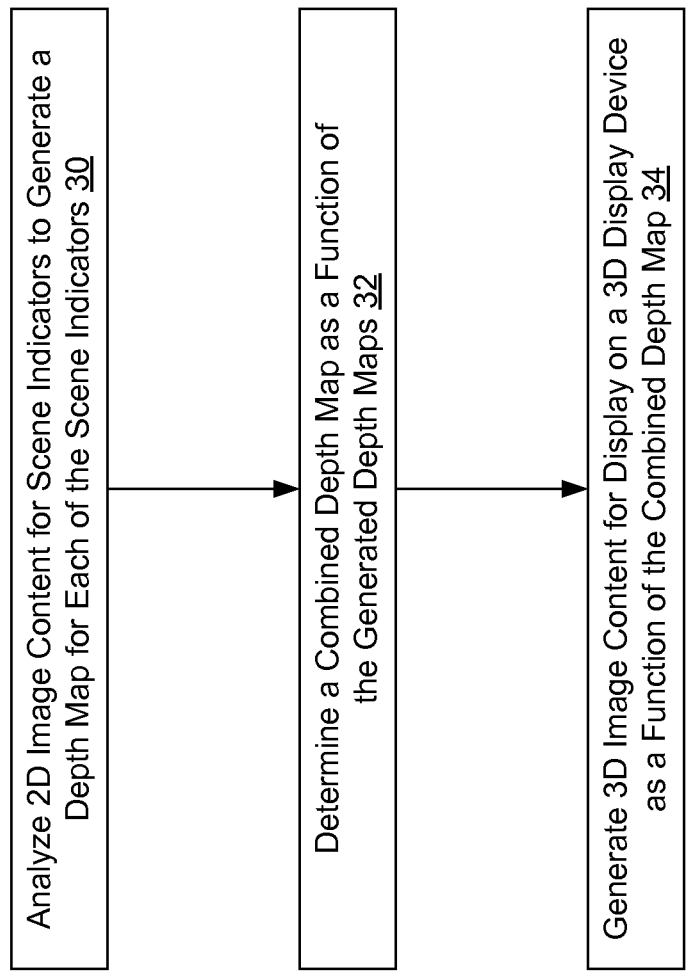
FIG. 3 illustrates a flow diagram for generating 3D image content from 2D image content.

FIG. 3 illustrates a flow diagram for generating 3D image content from 2D image content. 2D image content can be converted to 3D image content by analyzing the 2D image content to detect scene indicators 30. Based on the detected scene indicators, a depth map for each of the scene indicators is generated. Next, a combined depth map can be determined as a function of the generated depth maps 32. Lastly, the 3D image content can be generated as a function of the combined depth map 34. The generated 3D image content can then be displayed on a 3D display device.

Figure 4:
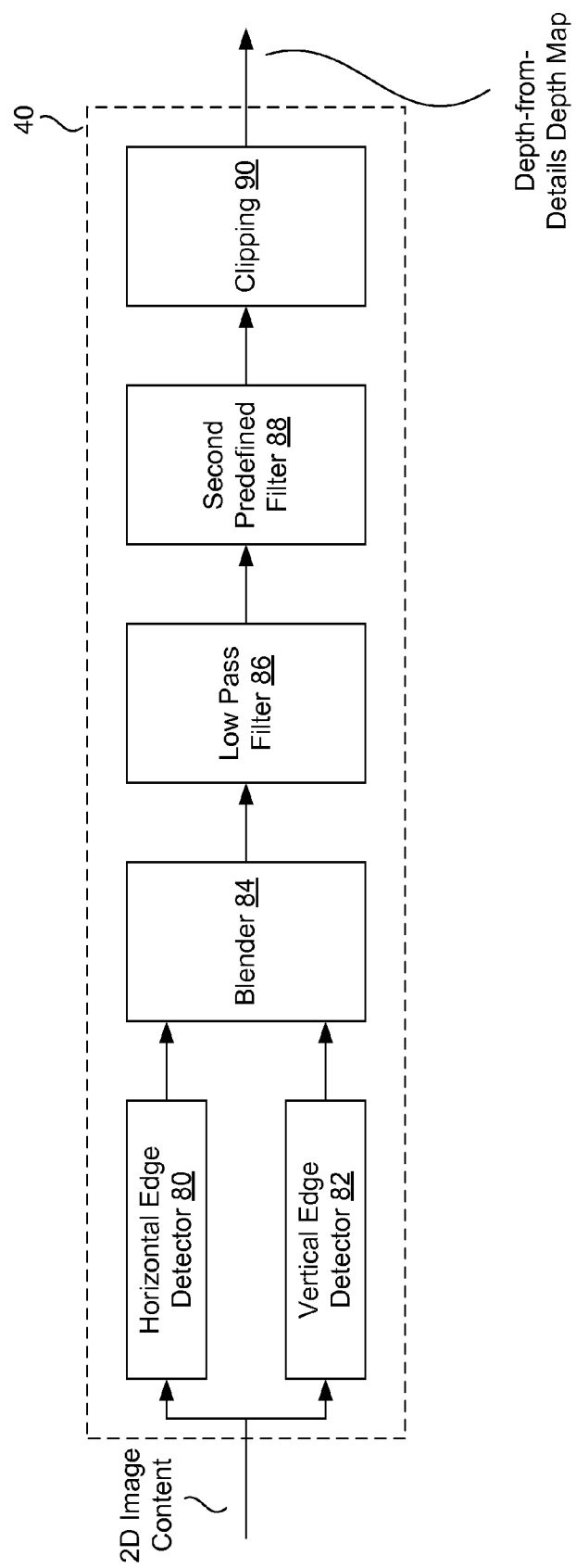
FIG. 4 illustrates a block diagram to generate a depth-from-details depth map from 2D image content.

FIG. 4 illustrates a block diagram to generate a depth-from-details depth map from 2D image content. The details analyzer 40 comprises a horizontal edge detector 80, a vertical edge detector 82, a blender 84, a low pass filter 86, a second predefined filter 88, and a clipping block 90. The 2D image content can be inputted to the horizontal edge detector 80 and the vertical edge detector 82. The horizontal edge detector 80 detects horizontal edges within the 2D image content. The vertical edge detector 82 detects vertical edges within the 2D image content. The detected horizontal and vertical edges can be weighted, and then blended by the blender 84. For instance, the detected vertical edges can be weighted more heavily than the detected horizontal edges before being inputted to the blender 84.

The blender 84 can then blend the detected edges, and output that blended data to the low pass filter 86. The low pass filter 86 filters the blended data and outputs the filtered data to the second predefined filter 88. The low pass filter 86 may not adequately provide a stable result. Thus, the second predefined filter 88 applies a stronger filter to the filtered data and outputs the further filtered data to the clipping block 90, which clips the further filtered data to generate the depth-from-details depth map. The predefined filter 88 can be programmed to provide a certain filter level. In this manner, a user can select the certain filter level based on application requirements.

The details analyzer 40 can be programmed to apply a certain depth for areas in the 2D image content as a function of the sizes of the areas in the 2D image content and the amount of details of those areas. In particular, larger areas with a small amount of details can be set to the background in the 2D image content. Small areas with a great amount of details can be set to the foreground in the 2D image content. Other combinations and thresholds can also be used in accordance with the disclosure to define the amount of depth to assign to the areas of the 2D image content. For instance, large areas with green color can be classified in the background (e.g., trees), while small areas with little details (e.g., humans) can be classified in the foreground.

Areas of the 2D image content can be defined pixel by pixel using a raster-scan mode. The areas can also be defined by dividing the respective image content into small blocks of regions, and processing those areas/regions accordingly, rather than a pixel-by-pixel method. Based on the disclosure, there can also be other methods for defining areas of the 2D image content known to a person having ordinary skill in the art. Therefore, the above examples are not meant to be limiting.

The details analyzer 40 can also focus on details from one or more components of a color space. For instance, details can be recovered from the luma component of the YUV color space for the 2D image content. The horizontal edge detector 80 can apply a filter on the 2D image content to detect the horizontal edges. Likewise, the vertical edge detector 82 can apply another filter on the 2D image filter to detect the vertical edges.

Figure 5:
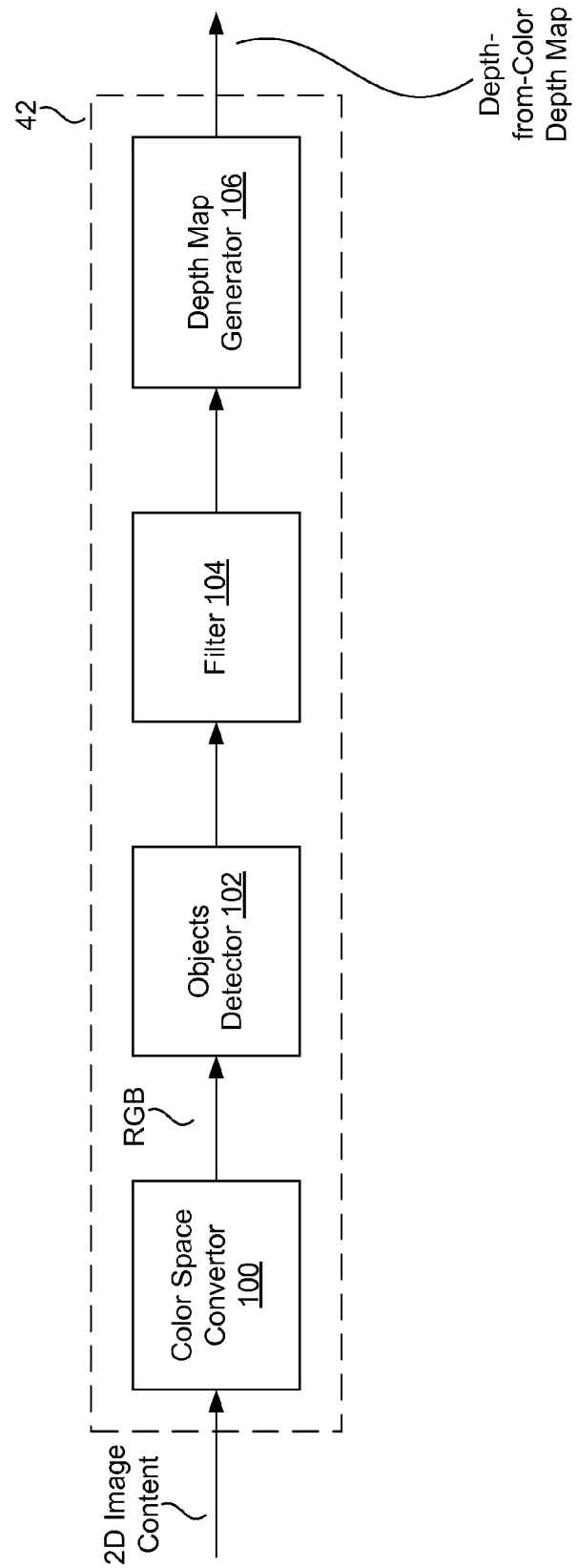
FIG. 5 illustrates a block diagram to generate a depth-from-color depth map from 2D image content.

FIG. 5 illustrates a block diagram to generate a depth-from-color depth map from 2D image content. The color analyzer 42 comprises a color space converter 100, an objects detector 102, a filter 104, and a depth map generator 106. The 2D image content is inputted to the color space converter 100. The 2D image content can be in a first color space, e.g., the YUV color space, and may need to be converted to another color space, e.g., the RGB color space for detection of a predefined color. However, the color space converter 100 is optional since the 2D image content may already be in a certain format, e.g., the RGB color space, where color detection can be directly applied.

The converted 2D image content can be inputted to the objects detector 102 which detects objects, including areas and/or other predefined items, of a certain predefined color. The detected objects can then be filtered by the filter 104. The filter 104 outputs the filtered objects to the depth map generator 106, which generates a depth-from-color depth map based on the filtered objects.

The color analyzer 42 can be programmed to apply a certain depth for certain areas of the 2D image as a function of the size of the detected objects in the 2D image content, locations of the objects, and the color of those certain objects. For instance, if a detected object or area is located in a top half of the 2D image content and the color of that object is substantially blue, then that area can be considered part of the background of the 2D image content and assigned a depth accordingly. Also, large objects or areas with dark colors, e.g., black, dark blue, or other darker colors, can also be programmed to be assigned as the background with an associated depth. It is understood that other predefined sizes, locations, and/or colors of objects and/or areas can also be used to analyze various 2D image content. Based on the disclosure, other scenarios can be programmed depending on the application requirements.

Figure 6:
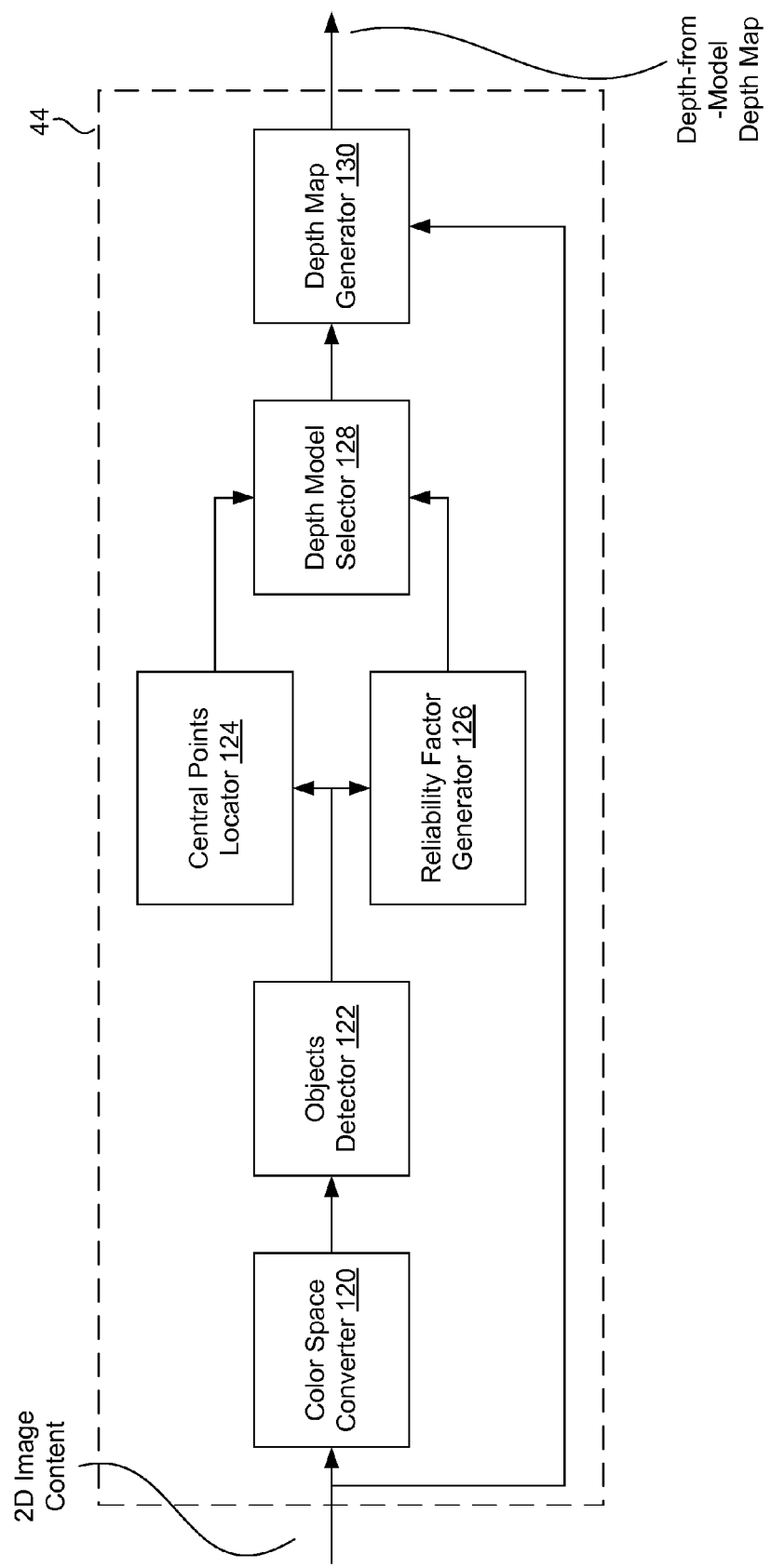
FIG. 6 illustrates a block diagram to generate a depth-from-model depth map from 2D image content.

FIG. 6 illustrates a block diagram to generate a depth-from-model depth map from 2D image content. The model analyzer 44 comprises a color space converter 120, an objects detector 122, a central points locator 124, a reliability factor generator 126, a depth model selector 128, and a depth map generator 130. The 2D image content is inputted to the color space converter 120. The 2D image content can be in a first color space, e.g., the YUV color space, and may need to be converted to another color space, e.g., the RGB color space, for detection of another color. However, the color space converter 120 is optional since the 2D image content may already be in a certain format, e.g., the RGB color space, where color detection can be directly applied.

The converted 2D image content can be inputted to the objects detector 122, which detects objects, including areas and other predefined items, of a certain predefined color. Based on those detected objects, a location map can be generated for the 2D image content of the locations that have the certain predefined color. Central points for that detected object can be determined by the central points locator 124 using the location map. For instance, a color histogram for the 2D image content along a vertical axis can be used to determine a central point vpx in the vertical axis, where $$vpx=x, \text{ where } hist\_x(x)=\max(hist\_x(\text{location map})). \quad \text{Equation [1]}$$

Another color histogram for the 2D image content along the horizontal axis can be used to determine a central point vpy in the horizontal axis, where $$vpy=y, y=\max(hist\_y(\text{location map})). \quad \text{Equation [2]}$$

Furthermore, a reliability factor generator 126 can determine a reliability factor sk_rel for the detected objects, where $$sk\_rel=\min(\max(\max((\max(hist\_x(\text{location map})/1024)-0.2)\times 4,(\max(hist\_y(\text{location map})/2048)-0.3)*2),0),1). \quad \text{Equation [3]}$$

Using Equations [1] and [2], a vanish point (vpx, vpy) can be defined. Ideally, the vanish point can be the peak distribution of the projection along the x-axis and along the y-axis. The vanish point is more reliable as the histogram is sharper.

The depth model selector 128 can receive the central points vpx and vpy and the reliability factor sk_rel. The depth model selector 128 selects a model based on the detected objects (e.g., the central points vpx and vpy) and the reliability factor. Once the model is selected, the selected model is outputted to the depth map generator 130 along with the 2D image content for generating the depth-from-model depth map.

Figure 7:
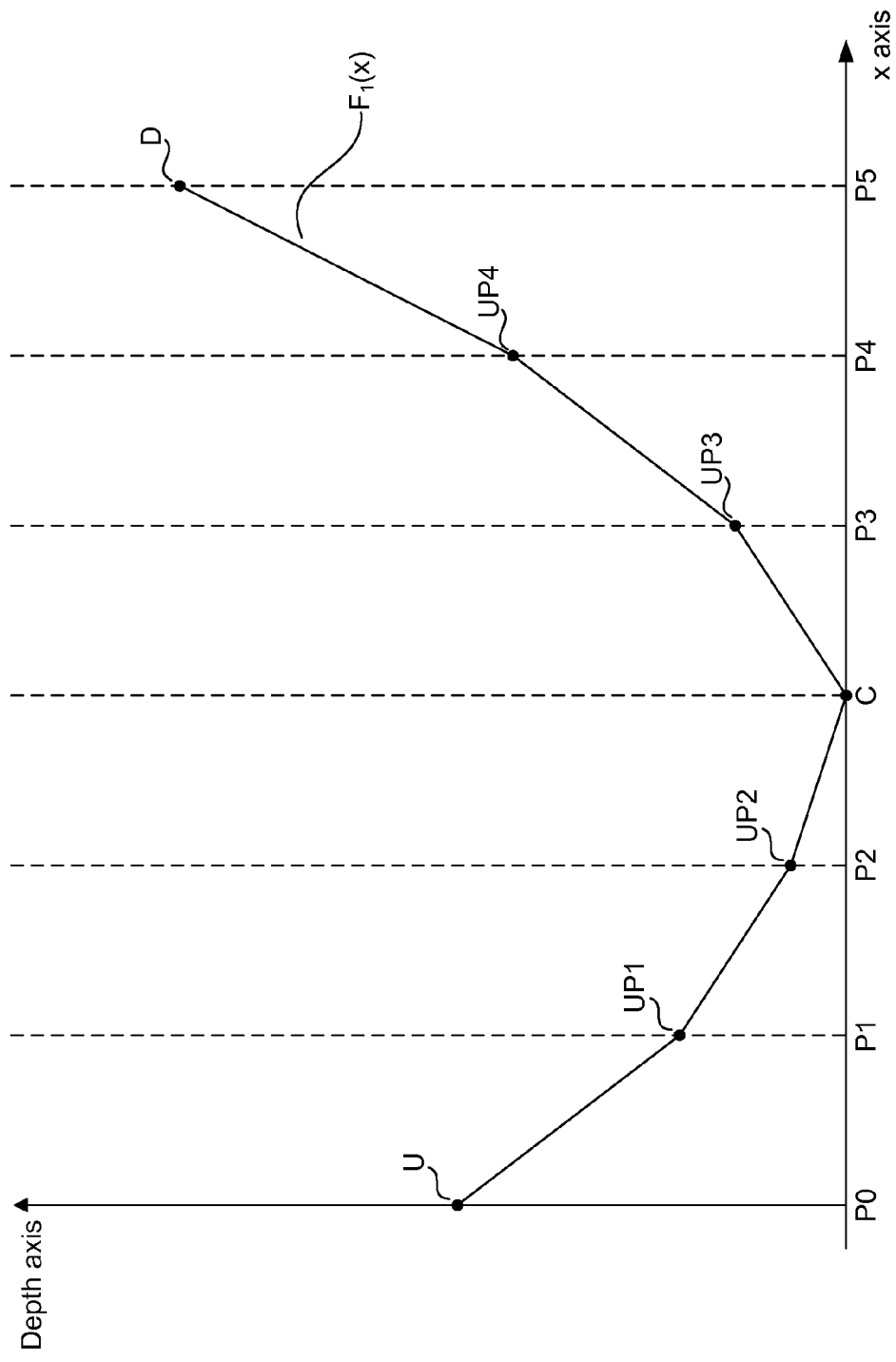
FIG. 7 illustrates a graph of an example of a depth model.

FIG. 7 illustrates a graph of an example of a model. The depth model selector 128 can assign depths such that object(s) near or at the central points vpx and vpy have less depth than objects further away from the central points vpx and vpy. As such, an object near or at the central points vpx and vpy can appear to be closer to the viewer in relation to that object than other items in the 2D image content. Depth curves $F_n(x)$ and $F_m(y)$ can be respectively defined in a horizontal axis (e.g., x axis) and/or a vertical axis (e.g., y axis) of the 2D image content. The depth curves F(x) and F(y) can also be defined separately, where the final depth information for the 2D image is determined by summing the depth curves together.

For instance, referring to FIG. 7, a depth curve $F_1(x)$ can be plotted using an x axis versus a depth axis to depict the amount of depth for objects along the x axis of the 2D image content. For x=C, a central point of a detected object, the central object can have no depth, i.e., depth=0. Based on Equations [1]-[3], point C can be found by $$C=szx/2*(1-sk\_rel)+vpx*sk\_rel, \quad \text{Equation [4]}$$

where szx is the width of the horizontal size of the picture width. Peripheral points, where x=0 and x=P5, can have greater depth values, i.e., $F_1(0)=U$ and $F_1(P5)=D$. Thus, objects of the 2D image content at or near the respective locations of x=0 and x=P5 can have more depth than objects near $F_1(C)$. Generally, the x value for P5 can be equal to the width size szx of the 2D image content, the width size of the respective detected object, or size of some other area of the 2D image content.

Similarly, a depth curve $F_2(y)$ can be plotted using the y axis versus a depth axis to depict the amount of depth for objects along the y axis of the 2D image content. The depth axis can correspond to the amount of depth to apply to objects at certain locations along the y axis.

Depth curves F( ) can be defined by piece-wise functions, and be controlled by three or more points, e.g., points C, U, and D. The central point C can be determined from Equation [4]. The point U can be associated with a pixel having a left or top position in the 2D image content. The point D can be associated with a pixel having right or bottom position in the 2D image content. Furthermore, the depth curve F( ) can be partitioned along its horizontal axis. For instance, x=P1 and x=P2 are within a region between x=P0 and x=C, where C-P2=P2-P1=P1-P0. Also, x=P3 and x=P4 are within a region between x=C and x=P5. The depth values of the depth curve for $F_1(P1)$, $F_1(P2)$, $F_1(P3)$ and $F_1(P4)$ can be respectively defined as UP1=U/2, UP2=U/6, UP3=D/2, and UP4=D/6. In order for the depth information to be continuous in a time domain, an IIR filter for points C, U, and D can be applied in the time domain, e.g., C'(t)=alpha*C(t)+(1-alpha)*C'(t-1) . . . etc.

While the disclosure has been described with reference to certain embodiments, it is to be understood that the disclosure is not limited to such embodiments. Rather, the disclosure should be understood and construed in its broadest meaning, as reflected by the following claims. Thus, these claims are to be understood as incorporating not only the apparatuses, methods, and systems described herein, but all those other and further alterations and modifications as would be apparent to those of ordinary skilled in the art.

We claim:

1. A method to convert two-dimensional ("2D") image content into three-dimensional ("3D") image content for display on a display device, comprising the steps of:
analyzing the 2D image content for predefined indicators and generating a depth map for each of the predefined indicators, wherein the predefined indicators comprise predefined details, wherein a depth-from-details depth map is generated as a function of the analyzed 2D image content, wherein the generation of the depth-from-details depth map comprises the steps of: determining one or more horizontal edges of the 2D image content; determining one or more vertical edges of the 2D image content; and blending the determined one or more horizontal edges and the determined one or more vertical edges to generate the depth-from-details depth map;
determining a combined depth map as a function of the generated depth maps; and generating the 3D image content for display on the display device as a function of the combined depth map.

2. The method of claim 1 wherein the predefined indicators comprise a predefined color and wherein a depth-from-color depth map is generated as a function of the analyzed 2D image content.

3. The method of claim 2 wherein the generation of the depth-from-color depth map comprises the steps of:
converting the 2D image content to a predefined color space;
detecting objects in the converted 2D image content having one or more predefined colors; and
generating the depth-from-color depth map as a function of the detected objects.

4. The method of claim 1 wherein the predefined indicators comprise a predefined model and wherein a depth-from-model depth map is generated as a function of the analyzed 2D image content.

5. The method of claim 4 wherein the generation of the depth-from-model depth map comprises the steps of:
converting the 2D image content to a predefined color space;
detecting objects in the converted 2D image content color space having one or more predefined colors;
determining a predefined model as a function of the detected objects; and
applying the predefined model to the 2D image content to generate the depth-from-model depth map.

6. The method of claim 5 wherein in the determining predefined model step, further comprising the steps of:
calculating central points of the detected objects;
generating reliability factors for the calculated central points; and
determining the predefined model as a function of the central points and reliability factors.

7. The method of claim 1 wherein the 2D image content is down scaled and wherein in the analyzing step, the down scaled 2D image content is analyzed.

8. The method of claim 7 wherein after the analyzing step, the analyzed 2D image content is up scaled.

9. The method of claim 1 wherein the predefined indicators comprise one or more predefined luma values and wherein a depth-from-luma depth map is generated as a function of the analyzed 2D image content.

10. A method to convert two-dimensional ("2D") image content into three-dimensional ("3D") image content for display on a display device, comprising the steps of:
analyzing the 2D image content for predefined indicators and generating a depth map for each of the predefined indicators, wherein the predefined indicators comprise predefined details, a predefined color, a predefined model, and one or more predefined luma values, wherein a depth-from-details depth map is generated as a function of the analyzed 2D image content, wherein the generation of the depth-from-details depth map comprises the steps of: determining one or more horizontal edges of the 2D image content; determining one or more vertical edges of the 2D image content; and blending the determined one or more horizontal edges and the determined one or more vertical edges to generate the depth-from-details depth map;
determining a combined depth map as a function of the generated depth maps; and
generating the 3D image content for display on the display device as a function of the combined depth map.

11. The method of claim 10 wherein a depth-from-color depth map is generated as a function of the analyzed 2D image content and wherein the generation of the depth-from-color depth map comprises the steps of:
converting the 2D image content to a predefined color space;
detecting objects in the converted 2D image content having one or more predefined colors; and
generating the depth-from-color depth map as a function of the detected objects.

12. The method of claim 10 wherein a depth-from-model depth map is generated as a function of the analyzed 2D image content and wherein the generation of the depth-from-model depth map comprises the steps of:
converting the 2D image content to a predefined color space;
detecting objects in the converted 2D image content color space having one or more predefined colors;
determining a predefined model as a function of the detected objects; and
applying the predefined model to the 2D image content to generate the depth-from-model depth map.

13. The method of claim 12 wherein in the determining the predefined model step, further comprising the steps of:
calculating central points of the detected objects;
generating reliability factors for the calculated central points; and
determining the predefined model as a function of the central points and reliability factors.

14. The method of claim 10 wherein the 2D image content is down scaled and wherein in the analyzing step, the down scaled 2D image content is analyzed.

15. The method of claim 14 wherein after the analyzing step, the analyzed 2D image content is up scaled.

16. The method of claim 10 wherein the generated depth map is a depth-from-luma depth map.

17. A method to convert two-dimensional ("2D") image content into three-dimensional ("3D") image content for display on a display device, comprising the steps of:
analyzing the 2D image content for predefined indicators and generating a depth map for each of the predefined indicators,
wherein the predefined indicators comprise predefined details, a predefined color, a predefined model, and one or more predefined luma values,
wherein a depth-from-details depth map is generated as a function of the analyzed 2D image content,
wherein the generation of the depth-from-details depth map comprises the steps of:
determining one or more horizontal edges of the 2D image content;
determining one or more vertical edges of the 2D image content; and
blending the determined one or more horizontal edges and the determined one or more vertical edges to generate the depth-from-details depth map;
wherein a depth-from-color depth map is generated as a function of the analyzed 2D image content,
wherein the generation of the depth-from-color depth map comprises the steps of:
converting the 2D image content to a predefined color space;
detecting objects in the converted 2D image content having one or more predefined colors; and
generating the depth-from-color depth map as a function of the detected objects, wherein a depth-from-model depth map is generated as a function of the analyzed 2D image content, wherein the generation of the depth-from-model depth map comprises the steps of:

converting the 2D image content to a predefined color space;

detecting objects in the converted 2D image content color space having one or more predefined colors;

determining a predefined model as a function of the detected objects; and applying the predefined model to the 2D image content to generate the depth-from-model depth map, and wherein a depth-from-luma depth map is generated as a function of the analyzed 2D image content;

determining a combined depth map as a function of the generated depth maps; and generating the 3D image content for display on the display device as a function of the combined depth map.

* * * * *